United States Patent [19]
Bookstein

[11] Patent Number: 5,838,305
[45] Date of Patent: Nov. 17, 1998

[54] FOOT-OPERATED CONTROL MECHANISM FOR COMPUTERS

[75] Inventor: Kenneth H. Bookstein, New Orleans, La.

[73] Assignee: Administrators of the Tulane Education Fund, New Orleans, La.

[21] Appl. No.: 812,378

[22] Filed: Mar. 5, 1997

[51] Int. Cl.⁶ ..................................................... G09G 5/08
[52] U.S. Cl. ........................................... 345/163; 385/156
[58] Field of Search ................................... 345/163, 164, 345/165, 156, 167, 157, 158, 168, 161; 341/22; 273/148 B

[56] References Cited

U.S. PATENT DOCUMENTS

| | | | |
|---|---|---|---|
| 5,552,807 | 9/1996 | Hayes et al. | 345/156 |
| 5,563,630 | 10/1996 | Tsakiris et al. | 345/158 |
| 5,565,891 | 10/1996 | Armstrong | 345/156 |
| 5,663,747 | 9/1997 | Shulman | 345/161 |

*Primary Examiner*—Dennis-Doon Chow
*Attorney, Agent, or Firm*—Michael D. Carbo; Jacqueline M. Daspit

[57] ABSTRACT

The invention comprises a foot-operated control for controlling operation of a computer by providing an input to the computer, such as controlling the position and movement of the computer's cursor in response to movement of one or more of an operator's feet. The foot-operated control includes a base; a pair of parallel rails mounted on the base; a rectangular frame slidably or rollably mounted on the rails for translation back and forth along the rails, the frame being adapted to receive a housing; a housing positioned within the frame and slidably or rollably engaged with the frame, the housing being moveable back and forth within the frame in a direction perpendicular to the direction of translation between the frame and the rails, the housing hosing a top surface and being adapted to enclose or cover a mouse, to allow the mouse to slidably engage the base, and to receive a foot on the top surface of the housing; and a mouse, disposed Mimic the housing, for controlling the position of the computer's cursor.

13 Claims, 2 Drawing Sheets

FOOT-OPERATED CONTROL MECHANISM FOR COMPUTERS

BACKGROUND OF THE INVENTION

The present invention relates to computer peripheral devices and more particularly to a remote device for controlling the position of a cursor or otherwise providing input to a computer.

At the present state of technology, keyboards and various spatial devices (computer "mice", trackballs, joy sticks and the like) are primarily relied upon for putting information into a computer. It is common in the computer industry to employ a combination of hardware and software to control a computer's cursor to control the function of a computer. A cursor device is commonly referred to as a mouse. Most hardware manufacturers provide capacity in their equipment for use of a mouse, and the cursor control provided by a mouse is commonly employed in software applications. For example, a mouse is used for cursor control applications in icon-based software of any kind, and is extensively used in computer controlled graphics applications.

Typically, a mouse having a trackball is located in the vicinity of the computer display unit. Most commonly, the mouse is supported on the same horizontal surface which supports the computer display unit, and a pad is often positioned between the support surface and the mouse for preventing slippage of a trackball during movement of the mouse. Alternatively, the mouse can be supported by a specialized pull-out shelf mounted below the computer display unit mounting surface. In either event, the mouse is operated by the user's hand by moving the mouse in a desired direction on the surface supporting the mouse to control the position of the computer's cursor. The movement of the mouse allows the associated trackball to roll over the surface. Signals related to the position of the mouse on the surface are transmitted into the computer to control the computer's cursor. This requires the operator to remove his or her hand from the computer keyboard whenever it is desired to change the position of the cursor. When the cursor has been positioned as desired the operator returns his or her hand to the keyboard to resume operation of the computer.

The operator's hand movements away from the keyboard to the mouse and back to the keyboard from the mouse involve some time and disruption in the operation of the computer. Moreover, people who are disabled in certain ways either cannot, or only with difficulty, can use a keyboard or a hand operated mouse.

The most commonly used spatial input devices are mice and trackballs. Both of these devices permit the hand to input spatial information and to manipulate visual displays associated with most computers. Mice are primarily spatial input devices used with computers and word processors. Since 1980, mice have been included in the majority of the successful new micro-computer systems. Substantial software utilizing mice has been developed. Alternative types of mice exist, including those using optical, electromagnetic, radio wave, infrared, and other inputs and outputs.

Mice are generally in the form of a small box or housing, usually placed off to the side of an otherwise standard computer keyboard. The box rests on the surface of a desk or a table. When the mouse input is desired, the box movement over the surface in various directions is translated into comparable two-dimensional movement on the computer display screen. Mice are commonly used to manipulate things on the screen, such as moving cursor or insertion point markers (as used for editing and controlling text and numeric data entry and selecting "cells" within spreadsheet programs), operating pull-down menus and windows, manipulating on-screen text and drawings, and generating graphics.

Trackballs are essentially "upside down" mice. The trackball within a housing is manipulated directly with a user's thumb or finger. The major advantage over mice is that the location remains constant and close to the keyboard which allows easier alternation between the keyboard and the trackball. The major disadvantage of a trackball, however, is that it is less controlled than a mouse, and it is somewhat less intuitive in use. A typical mouse can be picked up and then placed down in a different location on the surface to reposition the mouse on the working surface in relation to the position of the cursor on the computer screen. This allows for "resetting" the position of the cursor to keep or to move the cursor on the screen. Trackballs do not easily allow for such "resetting" of the cursor.

The use of a mouse or a trackball with presently known computers, however, usually requires the hand to leave the keyboard to operate the mouse. This is disruptive of the continuous and rapid flow of information between keyboard, mouse or trackball, and a computer. Some devices have been developed to permit a user's hands to remain on a computer keyboard while utilizing another means to control a cursor or to manipulate icons on a computer screen. Some of these "hands free" devices are foot-operated.

U.S. Pat. No. 5,334,997 to Scanlon discloses a foot-operated input device including a housing in which one or more trackballs are mounted, and a series of switches mounted to the housing. The trackballs control the position of the computer cursor. The switches are also actuated in response to an operator's foot movements and function in the same manner as switches associated with a mouse. The device disclosed in Scanlon includes trackballs that are manipulated directly with one's foot, and cannot be used with mice. The device disclosed in Scanlon does not allow for use with a conventional mouse, is less controllable than a conventional mouse, and is somewhat less intuitive to use than a mouse.

U.S. Pat. No. 5,148,152 to Stueckle et al. discloses a foot pedal mechanism for controlling input to a computer. The mechanism includes a housing, and a pair of foot pedals which actuate a potentiometer for computer input.

A foot-operated mouse marketed by the Swedish firm Kondator comprises a formed wooden piece adapted to the heel of a foot and having a triangular arrangement of ball bearings on the bottom surface to allow the user to move the wooden piece and an associated mouse with his or her foot. This device does not allow the entire weight of the user's lower limb to rest on the mouse. Typically, mice have plastic housings and will break if loaded by a person's weight. In other words, the mouse is not protected from the weight of the person using it and is subject to damage from loading. This foot-operated mouse requires the cursor movement function and the point-and-click function to be done with the same foot.

Another foot-operated mouse, marketed by Hunter Digital (Brentwood, Calif.), includes two foot pedals. One controls the cursor movement and speed, the other handles the point-and-click function. This device cannot be readily modified to incorporate conventional mice. The Hunter Digital foot-operated mouse uses an independent and stand-alone cursor input device that utilizes a "joystick" approach responsive to velocity or rate changes. The cursor movement control is not within a frame and therefore is not as intuitive or as easy to use as foot operated mouse constrained within a frame and utilizing a position-responsive signal.

Prior art foot-operated mice and trackballs either do not allow the operator to rest the entire weight of the lower limb on the mouse or require the moving and clicking functions to be done with a single foot. Prior art foot-operated mice are not constrained within a frame and are therefore less intuitive to use to control cursor movement. It is desirable to provide an improved foot-operated device which combines a conventional mouse and a housing unit which can bear the weight of a user's limb and which can move easily within a rectangular framework to allow for more intuitive use of the mouse.

SUMMARY OF THE INVENTION

The present invention overcomes the problems in the prior art by providing a foot operated control mechanism for controlling the movement of a cursor on a computer display.

In accordance with one embodiment of the invention, the invention contemplates a combination comprising a computer for use by an operator, and a foot-operated control for controlling operation of the computer by providing an input to the computer, such as controlling the position and movement of the computer's cursor in response to movement of one or more of an operator's feet. The foot-operated control includes a base; a pair of parallel rails mounted on the base; a rectangular frame slidably or rollably mounted on the rails for translation back and forth along the rails, the frame being adapted to receive a housing; a housing positioned within the frame and slidably or rollably engaged with the frame, the housing being moveable back and forth within the frame in a direction perpendicular to the direction of translation between the frame and the rails, the housing having a top surface and being adapted to enclose or cover a mouse, to allow the mouse to slidably engage the base, and to receive a foot on the top surface of the housing; and a mouse, disposed within the housing, for controlling the position of the computer's cursor.

The base is preferably flat, and preferably is level but can be placed on an angle if gravitationally-induced sliding movement of the housing and associated mouse is not a concern. A mouse pad can be disposed on the top of the base, can be recessed on the top of the base, or can be otherwise integrated with or incorporated on the base. It is preferable to maximize the area of the mouse pad to increase resolution, but within the constraints associated with the reach of an operator's foot.

The pair of parallel rails are preferably mounted on the base so that forward and backward motion (also known as trolleying) of the frame containing the housing and mouse along the parallel rails corresponds to up and down motion of a computer cursor on a computer screen. The rails should be sufficiently spaced apart to allow a full range of side to side motion of the housing within the frame corresponding to a full range of side to side motion of the computer cursor on the computer screen. The rails can be recessed within the base as long as the frame can slide or roll along the rails.

The frame is preferably rectangular, and may be square. The frame includes proximal and distal members connected by side members. The proximal and distal members can comprise a second pair of parallel rails. The side members should be spaced apart sufficiently to allow a full range of side to side motion corresponding to side to side motion of the computer cursor. The frame is adapted for rolling or sliding translation forward and back relative to the first set of rails. Preferably, rollers mounted on the side members of the frame and engaging the first set of rails allow the frame to translate forward and backward when the operator's foot moves the housing, disposed within and engaged with the frame, forward and backward.

The housing is slidable or rollable side to side within the frame. Wheels or rollers or sliding means, mounted either on the housing or within the frame on the proximal and distal members allow for side to side translation ("trolleying") of the housing along the proximal and distal members. The housing is engaged with the frame. This engagement with the frame prevents any downward movement of the housing, which would tend to crush or break the mouse contained within housing. The weight of the housing, and weight placed on the housing during use, are directed through the frame, through the parallel rails, and to the base, which is below the mouse.

The mouse is enclosed or trapped within or covered by the housing to allow the mouse to roll or slide along the base when an operator moves the housing with his or her foot. Alternative mice can be used, including mice employing optical, infrared, radio wave, and electromagnetic inputs and outputs.

The apparatus of the invention can be used without a mouse where a signal corresponding to the location of the housing within the frame and along the rails corresponds to the position of a cursor on a computer screen.

DETAILED DESCRIPTION OF AN EMBODIMENT OF THE INVENTION

Figure 1:
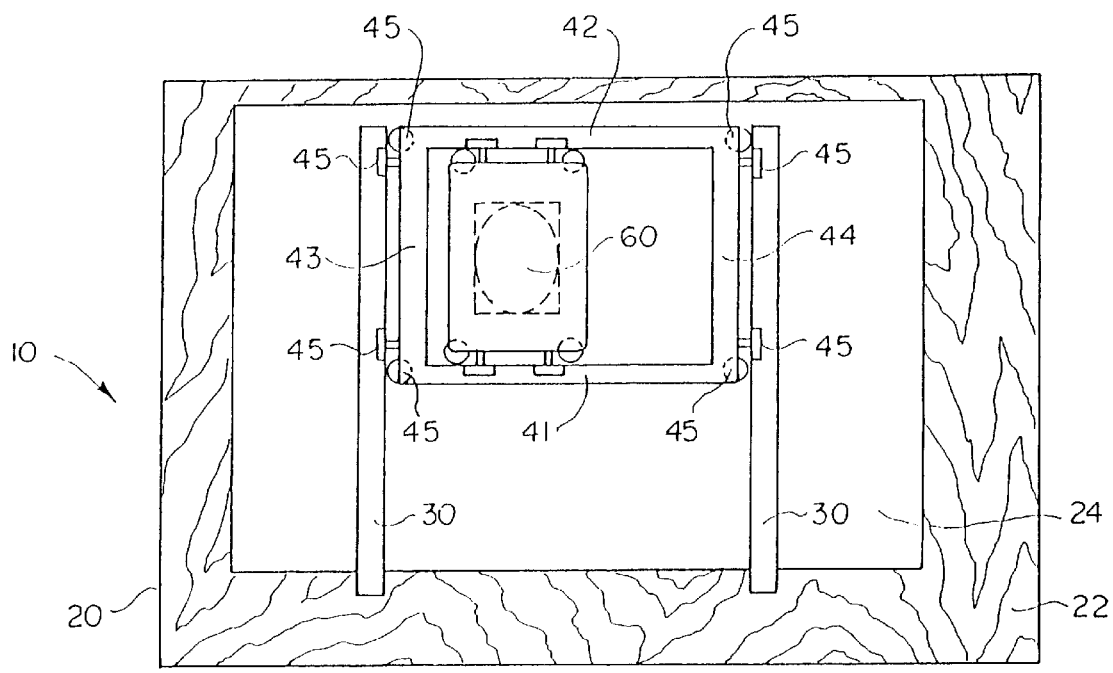
FIG. 1 is a top view of an embodiment of a foot-operated apparatus according to the invention.
Figure 2:
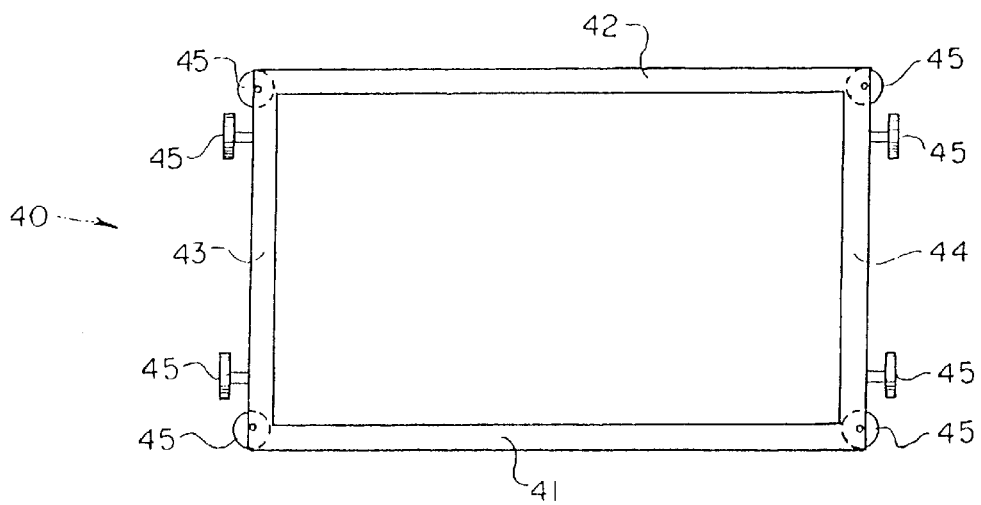
FIG. 2 is a top view of an embodiment of a frame according to the invention.
Figure 3:
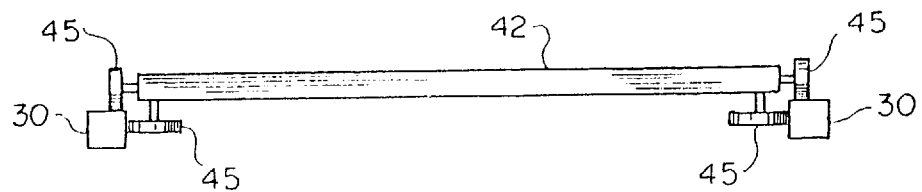
FIG. 3 is a side view of an embodiment of a frame according to the invention, showing engagement of rollers with rails.
Figure 4:
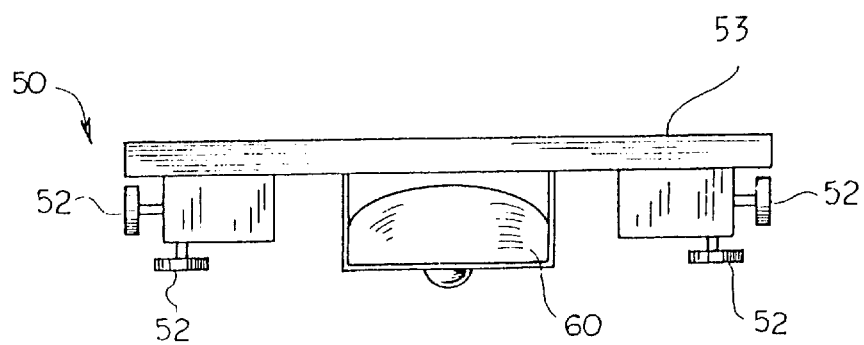
FIG. 4 is a side view of an embodiment of a housing according to the invention.

Reference now should be made to the drawings, in which the same reference numerals are used throughout to designate the same components. An embodiment of a foot-operated mechanism 10 for control of the position and movement of a computer cursor is disclosed. Mechanism 10 includes, generally, base 20, a pair of rails 30 mounted on base 20, frame 40 slidably or rollably mounted on rails 30, housing 50 disposed within frame 40, mouse 60 enclosed or received within housing 50, and means 70 for electrically or optically connecting mouse 60 to a computer, not shown.

Base 20 preferably has top surface 22, which top surface 22 is preferably flat and level. If gravitationally-induced sliding of the housing or the frame is not of concern, then base 20 can be placed on an angle. Mouse pad 24 can be placed on top of base 20 or can be recessed within top surface 22, or can be otherwise integrated with or incorporated on base 20. It is preferable to maximize the area of the mouse pad on the base. Alternatively, base 20 can be used without a mouse pad if top surface 22 is finished with or made of a material that accommodates a mouse without undue slippage of the trackball of a mouse on top surface 22.

Rails 30 are preferably mounted on base 20 so that forward and backward motion (relative to an operator) of frame 40 and associated housing 50 and mouse 60, either along or over the rails, corresponds to up and down movement of the cursor on a computer display screen. Rails 30 should be sufficiently far apart so as not to interfere with a fill side-to-side range of motion of the housing 50 within frame 40.

Frame 40 is preferably rectangular, but may be square or even some other shape. Preferably, proximal and distal (relative to the operator) members 41 and 42, respectively, are connected to side members 43 and 44 to form a frame. Various alternative frames can be used. Proximal and distal members 41 and 42 can comprise a second pair of rails. Preferably, side members 43 are spaced apart less than the spacing between rails 30. Frame 40 is adapted for rolling or sliding translation forward and backward along rails 30. The translation is known as trolleying.

A plurality of rollers or bearings 45 mounted on side members 43 or on proximal and distal members 41 and 42, or both, engage rails 30 to allow for back and forth trolleying. Any low friction contact between frame 40 and rails 30 will allow trolleying. Rollers 45 can be mounted on the bottom of side members 43 as well as on the side members 43 to allow frame 4 to trolley along rails 30. Alternative configurations of rollers 45 can be used.

Housing 50 is slidable or rollable side to side (from operator's perspective) within frame 40 by the use of wheels, rollers or sliding means 52 mounted either on housing 50 or within frame 40 on proximal and distal members 41 and 42. This rolling or sliding engagement of housing 50 within frame 40 allows housing 50 to translate or trolley side to side along proximal and distal members 41 and 42. Housing 50 may include shock absorbing means on the sides to reduce wear on housing 50 and on side members 43.

Housing 50 is preferably engaged with frame 40 by some of a plurality of rollers 52 affixed to housing 50, some rollers 52 disposed to the side and some disposed downward, so as to allow housing 50 to trolley side to side within frame 40 while also preventing any appreciable downward movement to housing 50, which would tend to crush mouse 60 between housing 50 and base 20. Frame 40 is in turn preferably mounted on rails 30 so that any downward force on housing 50 is absorbed by base 20 after being transmitted through frame 40, rollers 45, and rails 30. Alternatively, side members 43 or proximal and distal members 41 and 42 of frame 40 can be engaged directly to rails 30 with a low friction interface, thereby transmitting any load on housing 50, through frame 40 and rails 30, to base 20, and also to prevent appreciable downward movement of housing 50. Because conventional mice are not designed to accept loads that can be generated by an operator's leg, it is preferable to avoid placing any appreciable load on mouse 60. Instead of transmitting housing loads through frame 40, housing 50 can have wheels or rollers in contact with base 20 to transmit loads directly to base 20. Mouse 60 is engaged with mouse pad 24 by gravity. Foot pressure on housing 50 does not significantly affect the pressure of mouse 60 against mouse pad 24 because of the engagement of housing 50 on frame 40.

Housing 50 has upper surface 53 that can accept an operator's foot so that housing 50 can be translated or trolleyed, both back and forth and side-to-side, under the operator foot control. Upper surface 53 can be padded, and can be flat or contoured. Housing 50 is sized and shaped to receive mouse 60 therein so that mouse 60 slidably or rollably engages top surface 22 of base 20 when housing 50 is trolleyed. Mouse 60 can be connected to a computer through conventional electrical or optical connections 70.

By permitting the housing to enclose or incorporate already existing mice, the apparatus according to the invention can be used with existing computers that already have an associated mice. The only alteration of an existing mouse that may be desirable would be to separate the "clicking" or push-button function from the body of the mouse. Such separation is easily achievable by moving the "clicking" switch, normally located on a mouse, to a location apart from the mouse. Such an external "clicking" switch could be adapted for foot-actuation, hand-actuation, or alternative means of actuation. Alternatively, a switch or "clicker" can be added to the top of housing 50. The switch or clicker can comprise a push-button switch mounted on or semi-recessed within the top of housing 50.

Having described in detail an embodiment of the present invention, as well as various illustrative alternatives, it is to be appreciated and will be apparent to those of ordinary skill in the art that many modifications and physical changes could be made in the apparatus without altering the inventive concepts and principles embodied therein, and without departing from the true scope of the invention. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A foot-operated apparatus, for use by an operator, for computer control, comprising:

(a) a base;

(b) a pair of parallel rails mounted on the base;

(c) a frame slidably or rollably mounted on the rails for movement of the frame along the rails;

(d) a housing disposed within and slidably or rollably engaged with the frame, the housing being moveable within the frame in a direction perpendicular to the direction of movement of the frame along the rails, the housing having an upper surface adapted for receiving an operator's foot; and (e) a mouse, received within the housing such that the mouse slidably or rollably engages the base during movement of the housing for controlling the position of a cursor of a computer.

2. The apparatus according to claim 1, wherein the base is substantially flat.

3. The apparatus according to claim 1, wherein the rails are recessed in the base.

4. The apparatus according to claim 1, wherein the frame is rectangular.

5. The apparatus according to claim 4, wherein the frame comprises proximal and distal members and two sides members.

6. The apparatus according to claim 5 wherein the housing is engaged with the proximal and distal members of the frame by means of a plurality of roller bearings mounted on the housing.

7. The apparatus according to claim 1, wherein the housing is further engaged with the frame to prevent appreciable downward movement of the housing when a operator's foot is placed on the housing during use.

8. The apparatus according to claim 1, wherein the mouse received within the housing is operable by one of the operator's feet for controlling operation of the computer in response to the operator's foot movement of the housing.

9. The apparatus according to claim 1, wherein the mouse controls the position of the cursor by a signal input selected from the group consisting of optical signal input, infrared signal input, radio wave signal input and electromagnetic signal input.

10. A foot-operated control system for use by an operator in combination with a computer having a cursor, comprising:
  (a) a substantially flat base having a pair of parallel rails mounted thereon;
  (b) a rectangular frame moveably engaged with the rails for movement of the frame along the rails;
  (c) a housing disposed within and moveably engaged with the frame to allow movement of the housing within the frame in a direction perpendicular to the direction of movement of the frame along the rails, the housing being adapted to receive the operator's foot on an upper surface thereof; and
  (d) a mouse received within the housing such that the mouse slidably or rollably engages the base during movement of the housing for controlling operation of the computer in response to the operator's foot movements.

11. A foot-operated control apparatus for use by a computer operator, comprising:
  (a) a substantially flat base;
  (b) a pair of parallel rails mounted on the base;
  (c) a frame slidably or rollably mounted on the rails for movement of the frame along the rails;
  (d) a trolley unit disposed within and slidably or rollably engaged with a portion of the frame to allow for movement of the trolley unit within the frame in a direction perpendicular to the direction of movement of the frame along the rails;
  (e) means for identifying the location of the trolley unit; and
  (f) means for controlling a computer cursor, the controlling means being responsive to the location of the trolley unit.

12. The apparatus according to claim 11, wherein the location identifying means is responsive to the location of the trolley unit on the base.

13. The apparatus according to claim 11, wherein the location identifying means is responsive to the location of the trolley unit within the frame and along the rails.

* * * * *